United States Patent [19]
Marshall

[11] Patent Number: 5,676,006
[45] Date of Patent: Oct. 14, 1997

[54] PRELOADED-CAM FOLLOWER RAM ASSEMBLY FOR RESHAPING CONTAINERS

[75] Inventor: Harold James Marshall, Forest, Va.

[73] Assignee: Delaware Capital Formation, Inc., Wilmington, Del.

[21] Appl. No.: 532,012

[22] Filed: Sep. 22, 1995

Related U.S. Application Data

[63] Continuation of Ser. No. 400,257, Mar. 8, 1995, abandoned.

[51] Int. Cl.⁶ .................................................. B21D 51/26
[52] U.S. Cl. .................... 72/94; 72/452.6; 74/569
[58] Field of Search .................... 72/94, 356, 452.6, 72/210; 74/56, 569; 16/44; 105/150, 153, 155; 198/683, 684; 267/160; 384/54, 57, 58

[56] References Cited

U.S. PATENT DOCUMENTS

| | | | |
|---|---|---|---|
| 3,344,685 | 10/1967 | Crouzet | 74/569 |
| 3,374,684 | 3/1968 | Greven | 74/56 |
| 3,635,069 | 1/1972 | Eickenhorst | 72/361 |

FOREIGN PATENT DOCUMENTS

| | | | |
|---|---|---|---|
| 59-77161 | 5/1984 | Japan | 74/56 |

*Primary Examiner*—Lowell A. Larson
*Attorney, Agent, or Firm*—Reid & Priest LLP

[57] ABSTRACT

In machines for reshaping cylindrical metal bodies, wherein the machines include pairs of opposite, axially aligned ram assemblies, cams are provided for axially positioning tooling rams slidably supported by ram housings. The cams are provided having axially opposite cam guide surfaces, and cam followers are mounted on one axial end of each tooling ram with a cam follower being pivotally mounted to the tooling ram and biased into contact with a cam guide surface.

9 Claims, 13 Drawing Sheets

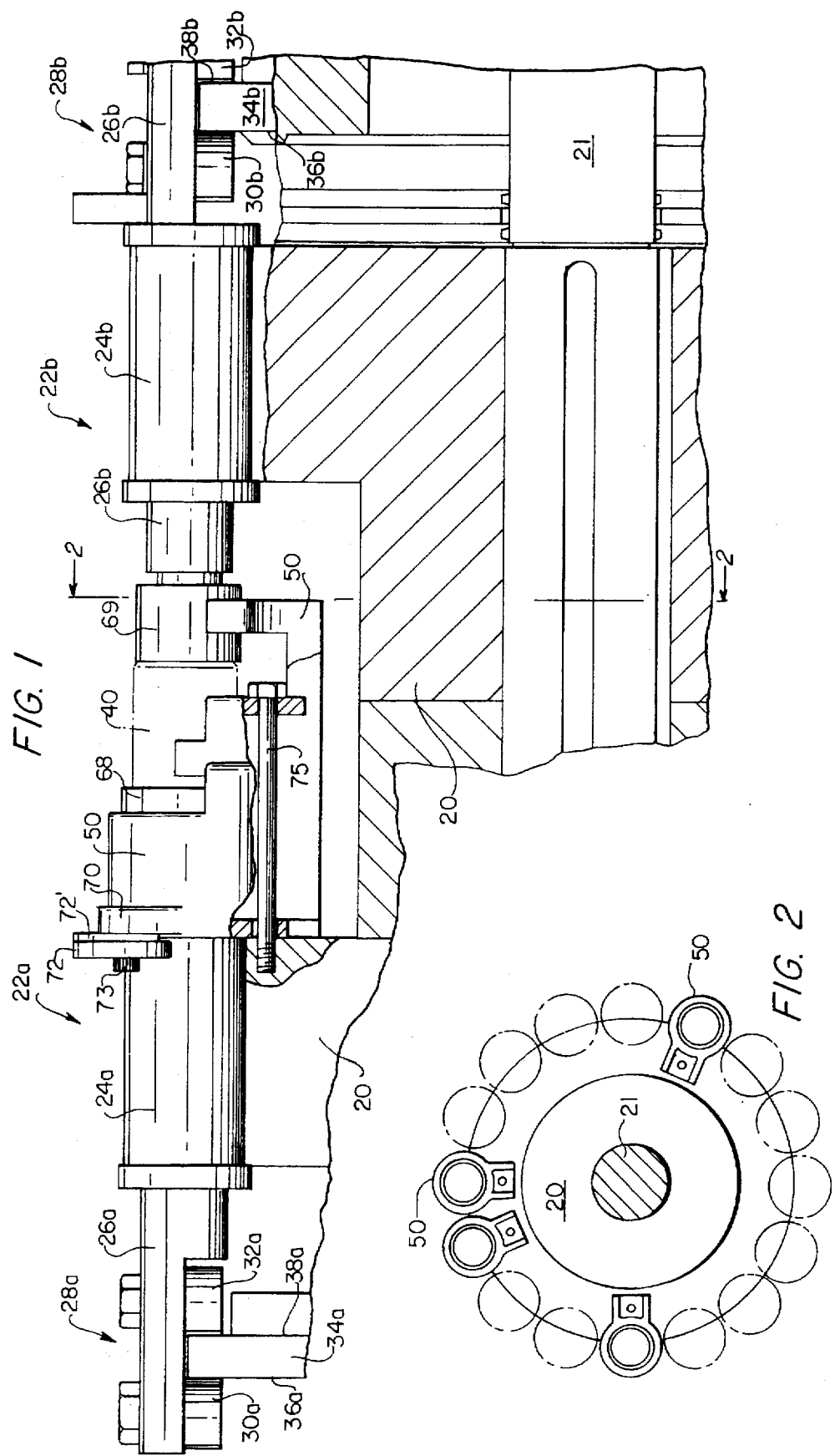

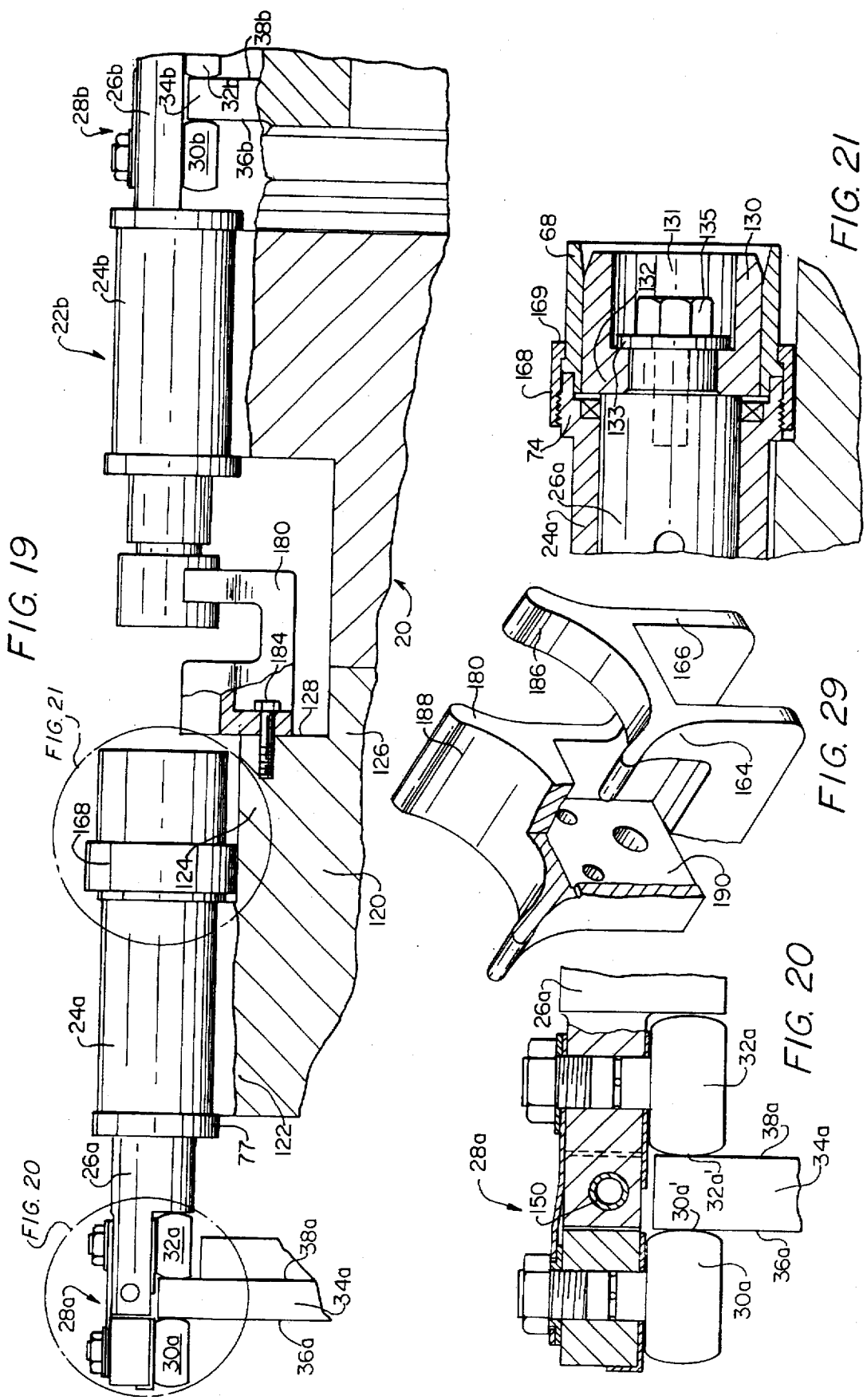

PRELOADED-CAM FOLLOWER RAM ASSEMBLY FOR RESHAPING CONTAINERS

This is a continuation of patent application Ser. No. 08/400,257, now abandoned, filed Mar. 8, 1995.

BACKGROUND OF THE INVENTION

1. Field of the Invention

The present invention relates to machines for reshaping cylindrical metal bodies. More specifically, the invention relates to an improved preloaded cam follower ram assembly that reduces wear on the cams designed for axially positioning various tooling used in the reshaping operations.

2. Related Art

Apparatus provided heretofore for supporting cylindrical metal cans during reshaping operations have included support means such as starwheels that require extensive adjustments of both the starwheels and other components for proper operation. Examples of such apparatus are shown in pending patent applications Ser. Nos. 08/189,241 and 08/189,243, which are herein incorporated by reference. More particularly, existing machines for processing can bodies include a turret that carries spindle ram assemblies supported in spindle housings. The spindle housings are supported at circumferentially spaced intervals around the outer periphery of a substantially cylindrical ram block portion of the turret. Each spindle ram assembly is mounted for orbital rotation about the axis of the turret and each spindle ram assembly carries can reforming tools that can be rotated about the axis of the spindle in addition to being capable of axial reciprocation substantially parallel to the axis of the turret. A central turret drive shaft runs through the center of the ram block coincident with the turret axis and is nonrotatably connected to the ram block, thereby providing for the orbital rotation of the spindles.

Existing apparatus also include means for positioning can bodies between longitudinally aligned spindles with such means comprising a starwheel having a plurality of pockets circumferentially spaced such that cans received in said pockets are supported coaxially relative to and between respective pairs of aligned spindles. The starwheel is bolted to the ram block portion of the turret and is axially positioned relative to the turret through the use of spacers such that the starwheel pockets will locate the cans being supported in a proper position along the axes of two longitudinally aligned spindles. Existing apparatus require the time-consuming replacement of such spacers and/or other adjustments whenever the can size is changed, during initial setup, following a production mishap such as a can jam, and as a result of normal wear and tear.

Furthermore, existing apparatus experience a great deal of cam wear on the cams used for generating axial reciprocation of the can reforming tools. This wear results from the "skidding" that occurs between cam followers (generally rollers) mounted on the spindle ram assemblies and the surface of the cam that is contoured to drive the cam followers in alternate axial directions. During high speed can reforming operations this wear becomes a significant problem as the momentum gained by the spindle ram assemblies causes the cam followers to alternately break contact and make contact with the cam drive surface. When the cam followers break contact with the cam their rotational speed decreases so that upon making contact again with the cam the cam followers must accelerate rapidly up to the relative speed between the orbiting spindle and the stationary cam. The skidding between the cam followers and the stationary cam occurs during this period of rapid acceleration.

SUMMARY OF THE INVENTION

It is therefore an object of the present invention to provide for a novel and improved method of positioning and supporting a can body during reshaping operations, and to provide a cam follower assembly that eliminates the problem of wear on the cam resulting from skidding between the cam followers and the cam.

The apparatus of the present invention provides a means for accurately supporting a container adjacent a tooling die during the performance of reshaping operations by the tooling die on the container. The apparatus has fastening means for being demountably fastened to a spindle housing that supports the tooling die in position for engagement of the tooling die with one of opposite ends of the container supported by the apparatus. The fastening means comprises a plurality of lugs extending radially from an outer periphery of said apparatus, said lugs having threaded bolt holes therethrough for threaded engagement with bolts that pass through a segmental flange and tighten the segmental flange up against a radially extending rim portion of the spindle housing. Additionally, a bolt hole is provided through the apparatus for passage of a relatively long bolt that engages with a threaded hole in the ram block portion of the turret at a position radially inward from the spindle housing.

In a first embodiment the apparatus is formed with unitary construction and has an annular portion, a boxlike portion, and a first arcuate portion with said annular portion and said first arcuate portion being supported by said boxlike portion so that a center of radius of said first arcuate portion and a center of radius of said annular portion are collinear, thereby providing means for cradling the container in position coaxial with and adjacent the tooling die. The above-mentioned lugs for fastening the apparatus to the spindle housing extend radially from the outer periphery of the annular portion of the can support tool. The hole for the relatively long bolt that engages with the ram block portion of the turret passes through the boxlike portion of the apparatus.

In a second embodiment, the can support tool is formed from a separate can pocket and a tooling retainer. The tooling retainer comprises an annular portion having radially extending lugs for fastening the can support tool to the housing of the tooling die in the same fashion as employed with the unitary can support tool described above. A boxlike portion of the tooling retainer integral with the annular portion has a hole therethrough for the passage of a bolt that engages with the ram block portion of the turret in the same fashion as employed with the unitary can support tool described above. This boxlike portion also has dowel pin holes for insertion of dowel pins that serve to locate and support the can pocket adjacent the tooling retainer, and bolt holes for bolts that fasten the can pocket to the tooling retainer.

The can pocket is pinned and bolted to the tooling retainer and comprises two axially spaced arcuate portions for cradling a can and an integral boss portion through which dowel pin holes and bolt holes are provided for positioning the can pocket relative to the tooling retainer, fastening the can pocket to the tooling retainer, and fastening the two piece can support tool to the ram block portion of the turret.

The two piece can support tool construction provides the advantage of ease of interchangeability for cans of different sizes since only the can pocket need be replaced for adapting to cans of different sizes while the tooling retainer can remain bolted to the turret and the spindle housing.

In a third embodiment the tooling retainer portion of the above-described two piece can support tool is eliminated entirely. Rather than bolting and pinning a tool retainer portion of the can support tool to the ram block portion of the turret, the ram block is provided as a unitary, stepped cylindrical block having a first large diameter portion, an intermediate diameter portion and a small diameter portion. The large diameter portion of the ram block is scalloped around its outer periphery at equally spaced intervals. Each of the spindle housings is cradled in a respective scalloped portion of the ram block with the radially extending rim portions of the spindle housings straddling the length of the larger diameter portion of the ram block. The intermediate diameter portion of the ram block extends from the larger diameter portion of the ram block, parallel to the spindle axes for a distance approximately equal to the length of the tooling retainer of the second embodiment of the can support tool. This intermediate diameter portion of the ram block replaces the tooling retainer of the second embodiment and provides a radial shoulder into which the can pocket can be bolted and pinned for easy interchangeability depending on the size of the can being reshaped.

The preloaded cam follower ram assembly of the present invention includes stationary, substantially disk-shaped cam members mounted substantially perpendicular to a turret drive shaft that is coaxial with and fixedly connected to a ram block supporting a group of circumferentially spaced spindle ram assemblies. The cam members have first and second contoured, axially opposite cam guide surfaces.

The spindle ram assemblies each have a pivotal portion at a first axial end, and a mounting portion adjoining the pivotal portion. A first cam follower is mounted on the pivotal portion and a second cam follower is mounted on the mounting portion. Biasing means are provided for biasing the first cam follower into contact with the first cam guide surface and for biasing the second cam follower into contact with the second cam guide surface.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 comprises a front elevation view of a first embodiment of the apparatus in accordance with the present invention;

FIG. 2 comprises a transverse sectional elevation view of the apparatus shown in FIG. 1 taken in the direction of arrows 2—2 of FIG. 1;

FIG. 19 is a front elevation view of a third, preferred embodiment of the apparatus according to the present invention.

FIG. 20 is an enlarged view partially in cross section of the preloaded cam follower assembly of FIG. 19.

FIG. 21 is an enlarged cross sectional view of one end of the spindle housing of FIG. 19 showing the tooling die and the knockout punch.

FIG. 29 is a perspective view of the can pocket that makes up part of the third, preferred embodiment of the apparatus according to the present invention.

DETAILED DESCRIPTION OF THE PREFERRED EMBODIMENTS

Figure 3:
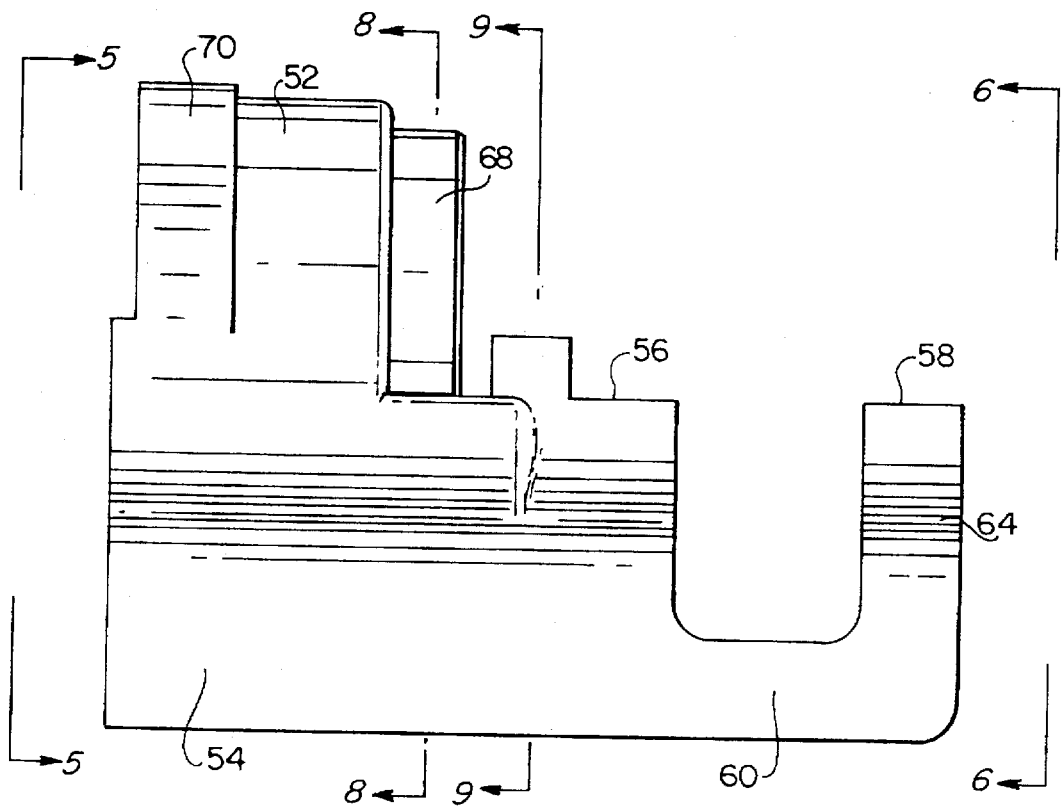
FIG. 3 comprises a side elevation view of a first embodiment of a can support tool according to the present invention.
Figure 4:
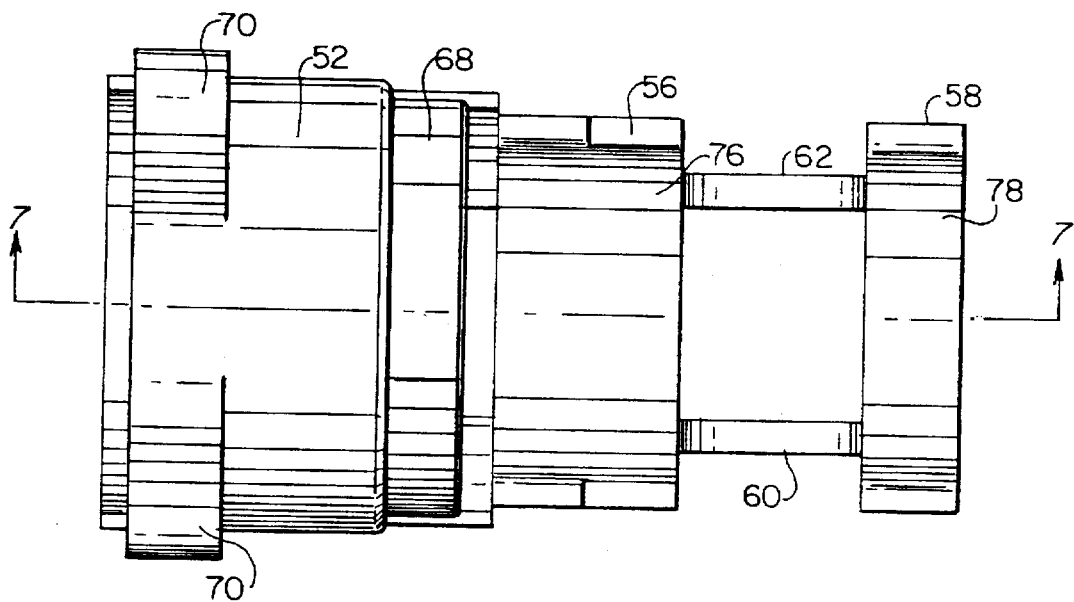
FIG. 4 comprises a top plan view of the can support tool shown in FIG. 3.
Figure 7:
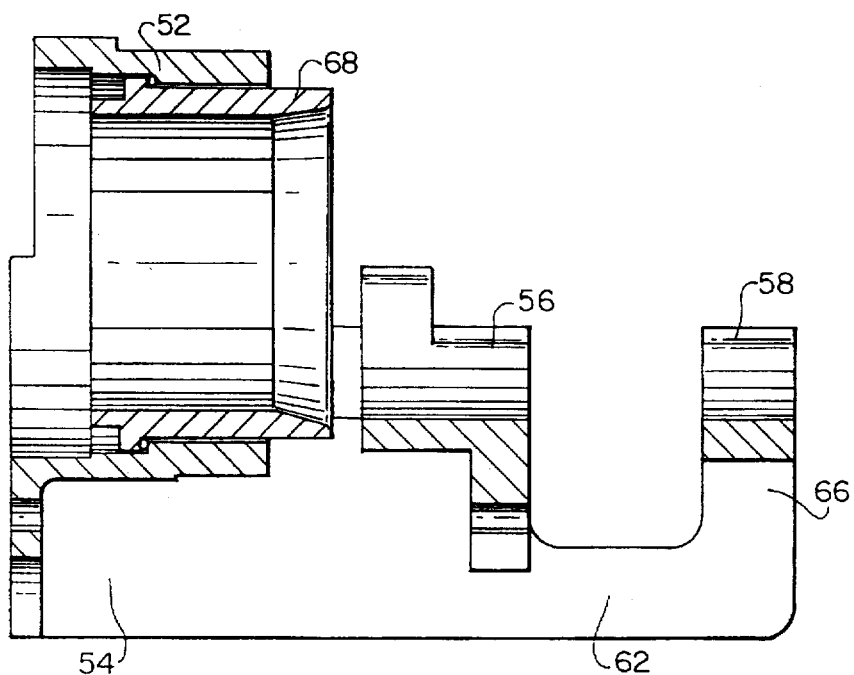
FIG. 7 is a bisecting sectional view taken along lines 7—7 of FIG. 4.
Figure 5:
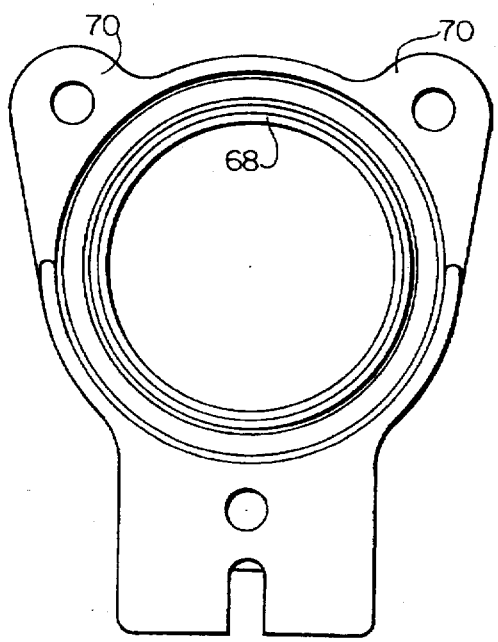
FIG. 5 is an end elevation view of the can support tool of FIG. 3 taken in the direction of arrows 5—5 of FIG. 3.
Figure 6:
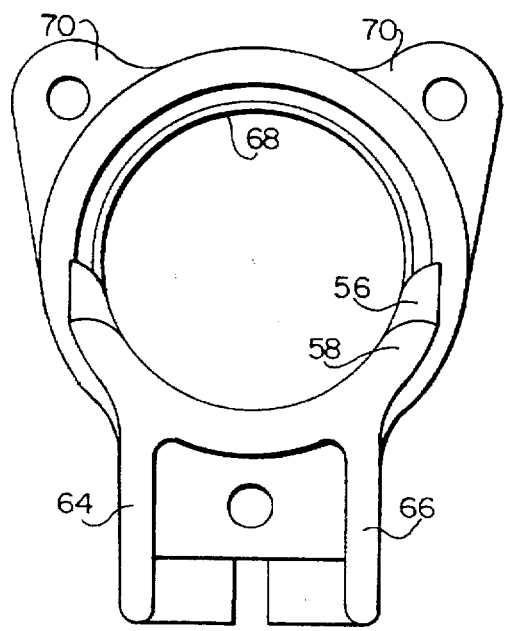
FIG. 6 is an end elevation view of the can support tool of FIG. 3 taken in the direction of arrows 6—6 of FIG. 3.
Figure 8:
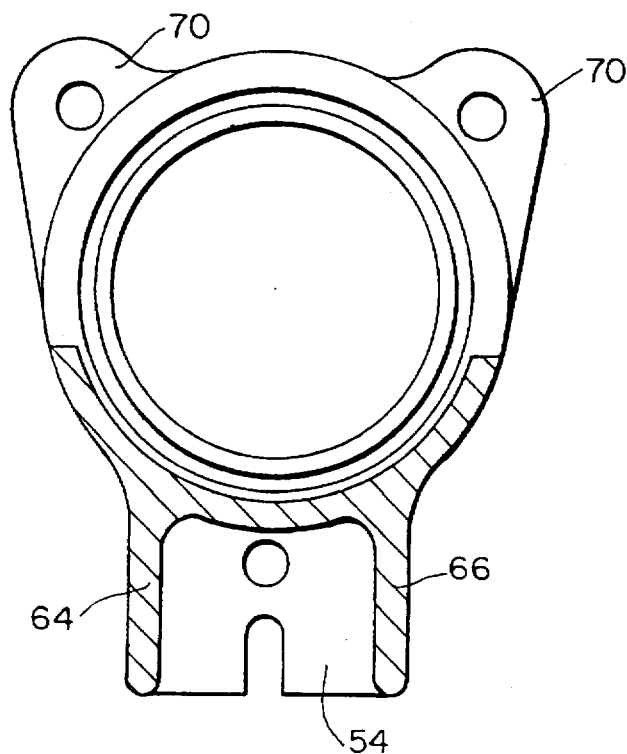
FIG. 8 is a sectional view taken along lines 8—8 of FIG. 3.
Figure 9:
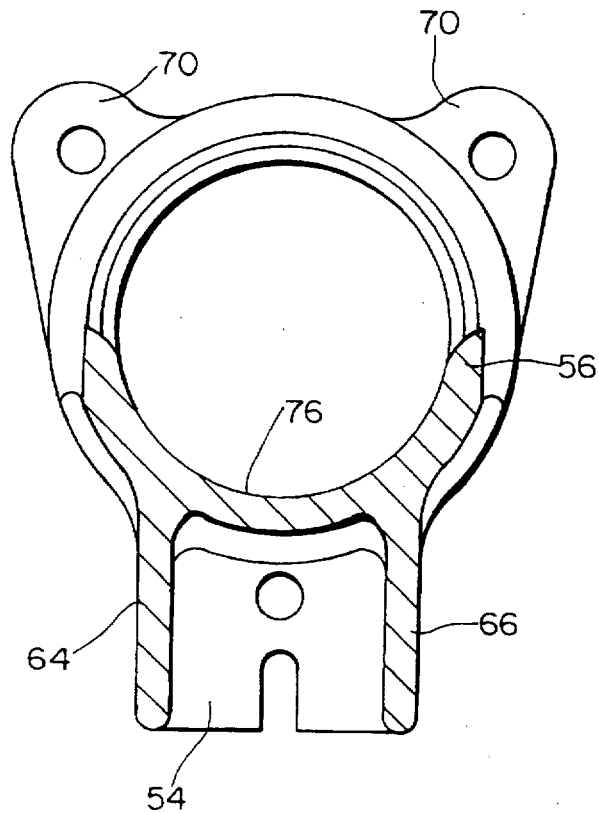
FIG. 9 is a sectional view taken along lines 9—9 of FIG. 3.
Figure 11:
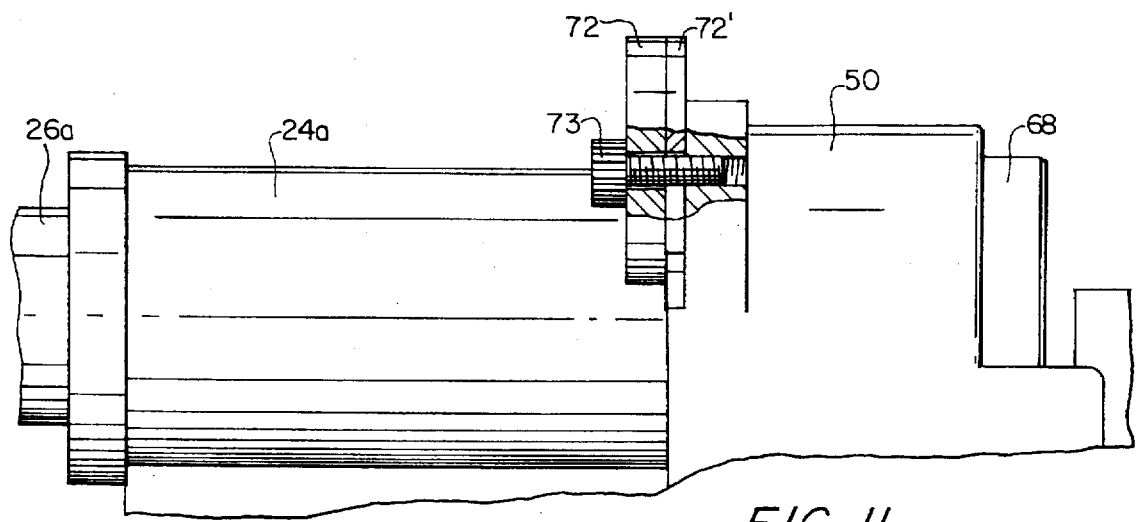
FIG. 11 is a front elevation view of a portion of the embodiment of the present invention shown in FIG. 1, with a portion of the can support tool broken away to show a method of attachment to a spindle housing.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

The general arrangement and structure of a can processing machine including the can support tool of the present invention is best understood from FIGS. 1 and 2. More specifically a turret 20 is mounted on a turret shaft 21 for rotation therewith in well known manner. Sixteen pairs of opposite, axially aligned spindle ram assemblies 22a and 22b are mounted on turret 20 at equally spaced intervals around the outer circumference of turret 20. Spindle ram assemblies 22a and 22b each include a spindle ram housing 24a and 24b respectively, rigidly fixed to turret 20, and a spindle ram assembly 26a and 26b respectively, that is free to move axially within a respective spindle ram housing 24a or 24b. In certain applications, spindle ram assembly 26a and/or spindle ram assembly 26b may be provided with a coaxial, rotatably mounted tooling shaft that is free to rotate and may provide means for mounting can reshaping tools such as rollers for reforming the can bottom. Examples of such applications are shown in copending U.S. patent application Nos. 08/189,241, 08/189,243 and 08/268,812, which are herein incorporated by reference.

One end of spindle ram assembly 26a includes a cam follower 28a comprising a pair of rollers 30a and 32a; similarly, one end of spindle ram assembly 26b includes a cam follower 28b comprising a pair of rollers 30b and 32b. First and second stationary cam members 34a and 34b are respectively provided at opposite ends of the apparatus facing axial ends of turret 20 with cam 34a including cam faces 36a and 38a engaging cam follower rollers 30a and 32a respectively. Similarly, cam member 34b has cam faces 36b and 38b which engage cam follower rollers 30b and 32b respectively. Cam members 34a and 34b are rigidly connected to a frame (not shown) such that cam members 34a and 34b remain stationary while turret 20 rotates.

It will be appreciated that rotation of turret 20 rotates each spindle ram assembly 22a and 22b about the turret axis which is coextensive with the axis of turret shaft 21, and that the axial positions of opposed cam faces 36a and 38a operate to axially position spindle ram assembly 26a relative to turret 20. Cam faces 36b and 38b similarly operate to axially position spindle ram assembly 26b. The cam faces of cam 34b are appropriately contoured to achieve movement of spindle ram assembly 26b between an extended position in which a push pad 69 mounted on spindle ram assembly 26b is positioned axially for contact with an end of a can 40, and a retracted position in which push pad 69 is axially spaced from that can end.

Spindle ram assembly 26a is similarly axially reciprocated by cam 34a. When the apparatus is set up as shown for a particular can necking operation, a knockout punch 130 is mounted on the outer end of spindle ram assembly 26a. As shown in FIG. 21, knockout punch 130 can be mounted to the outer end of spindle ram assembly 26a by a threaded stud 135 extending from the outer end of spindle ram assembly 26a through a base portion 132 of knockout punch 130 into a recess 131 of knockout punch 130. A nut 133 is threaded over stud 135 and abuts base 132 of knockout punch 130, holding knockout punch 130 against the outer end of spindle ram assembly 26a.

An axially fixed position tooling die 68 is attached to the left spindle housing 24a. The contours of cam faces 36a and 38a are operable for moving spindle ram assembly 26a at the proper time to knock out can 40 from tooling die 68 after the necking operation is completed. The contours of cam faces 36b and 38b are operable for moving spindle ram assembly 26b and push pad 69 toward and away from the axially fixed position tooling die 68 in order to push can 40 onto die 68 during the necking operation. In other types of operations, spindle ram assemblies 26a and 26b could be used for moving working components mounted on a rotatable tooling shaft in accordance with the nature of the operation being performed, as discussed above.

In a first embodiment, can support tools 50 are bolted to turret 20 and spindle housings 24a in order to provide means for supporting cans 40 in axial alignment between the two opposite axially aligned spindle ram assemblies 26a and 26b. A single can support tool 50 is bolted to each spindle housing 24a on one side (the left as shown in FIG. 1) of turret 20, for a total of 16 can support tools 50.

Figure 10:
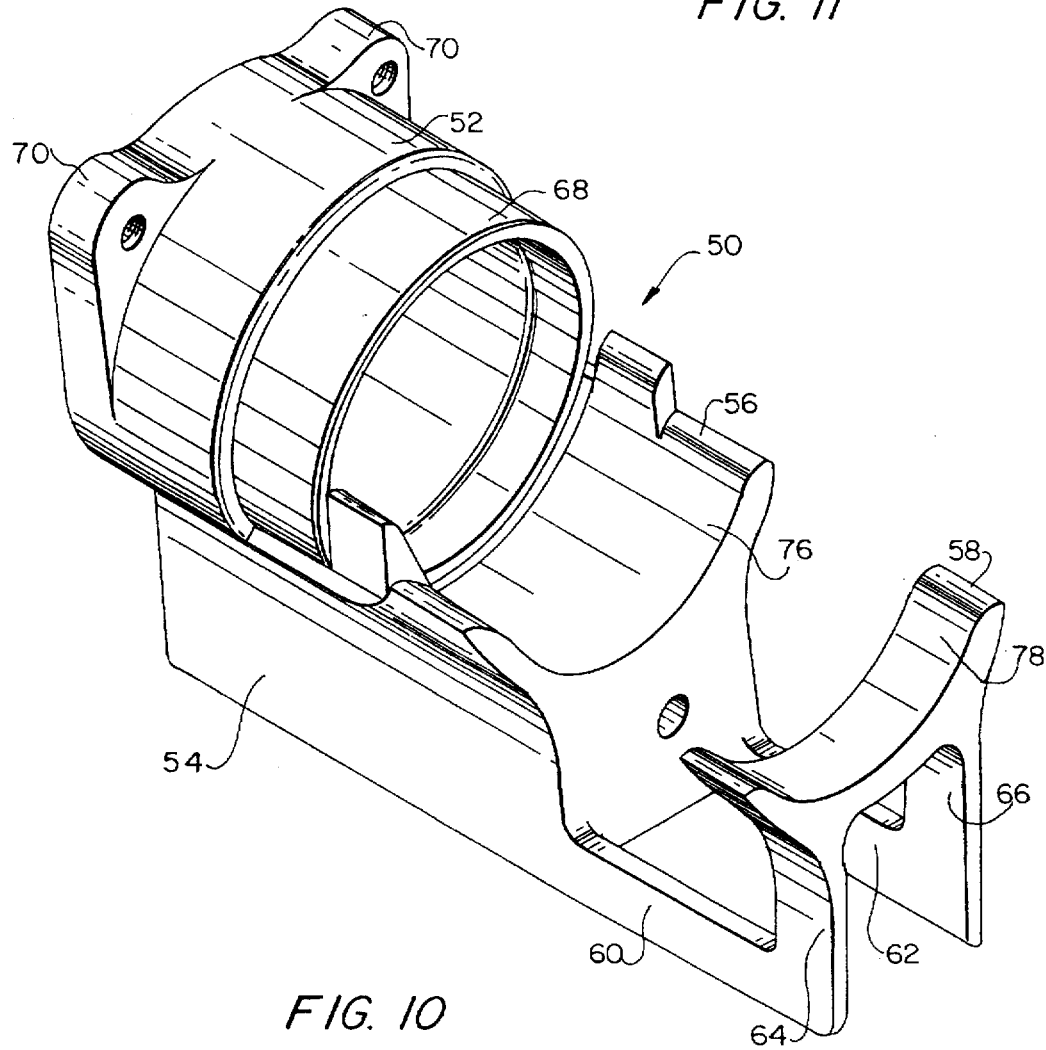
FIG. 10 is a perspective view illustrating the can support tool of FIG. 3.

Referring initially to FIG. 10, in a first embodiment of the present invention, can support tool 50 comprises an annular portion 52, a boxlike portion 54 and coaxial arcuate portions 56 and 58 spaced axially from annular portion 52.

In this embodiment, annular portion 52, and arcuate portions 56 and 58 are supported by boxlike portion 54 so that a center of radius of annular portion 52 and the center of radius of each of arcuate portions 56 and 58 are collinear. Arcuate portion 58 is supported on boxlike portion 54 by two axially extending parallel cantilever arms 60 and 62 extending from boxlike portion 54 and connected to two transverse parallel arms 64 and 66 that are integral with arcuate portion 58, as best shown in FIG. 10.

Figure 12:
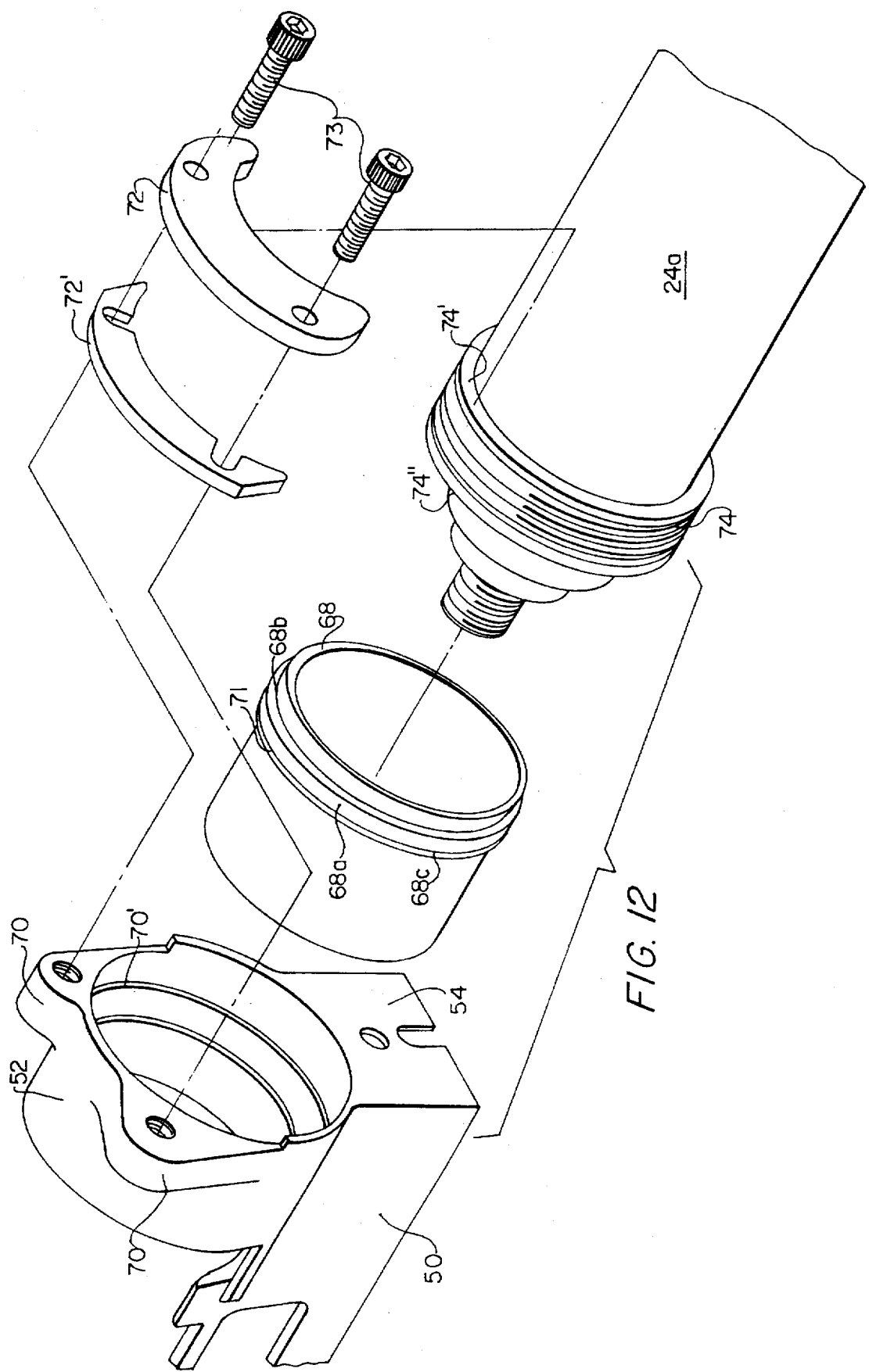
FIG. 12 is an exploded perspective view of a portion of a can support tool, a tooling die, segmental flanges, and a spindle housing of the present invention showing a method of assembly of the components.

Annular portion 52 is dimensioned in order to fit snugly, but removably, over the outer periphery of a tooling die 68 protruding from one end of left spindle housing 24a. Lugs 70 protrude radially from annular portion 52 and provide first and second bores for receiving threaded machine bolts 73 for aiding in bolting can support tools 50 to spindle housings 24a. The means for bolting can support tool 50 to each spindle housing 24a comprises segmental flanges 72 and 72' (FIG. 12) which are placed so that segmental flange 72 engages radial end surface 74' of a threaded larger diameter rim portion 74 (FIG. 12) of spindle housing 24a and segmental flange 72' acts as a spacer between lugs 70 and segmental flange 72 and rests on the outer circumference of rim portion 74 while annular portion 52 and lugs 70 partially surround rim portion 74, enabling the clamping of spindle housing rim portion 74 in between segmental flange 72 and lugs 70 as best shown in FIG. 12. The proper axial positioning of can support tool 50 relative to spindle housing 24a is assured by the engagement of radial end surface 68b on a large diameter rim portion 68a of tooling die 68 with radial end surface 74" of rim portion 74 on spindle housing 24a; and the seating of o-ring 71 located on a radial end surface 68c opposite from radial end surface 68b on tooling die 68 against an internal radial shoulder 70' of annular portion 52 on can support tool 50 (as shown in FIG. 12). Boxlike portion 54 also has a bolt hole with a central axis parallel to the central axis of annular portion 52 that enables the bolting of can support tool 50 to turret 20.

Once can support tool 50 has been bolted to spindle housing 24a and turret 20, concave surface 76 of arcuate portion 56 is positioned to enable the cradling of a can 40 with its central axis in alignment with the central axes of spindle ram assemblies 26a and 26b. Concave surface 78 of the arcuate portion 58 is aligned with concave surface 76 and is configured to provide clearance for can push pad 69 attached to spindle ram assembly 26b and extending from spindle housing 24b adjacent the closed axial end of can 40 that is opposite from the open axial end of can 40 to be reshaped by tooling die 68 supported on spindle ram assembly 26a.

Can support tool 50 provides a means for simply, quickly and efficiently adapting a can reshaping machine to handle different sized cans since only three bolts must be removed and replaced when a different can support tool 50 configured for a different size can 40 is installed on the can reshaping machine. The can support tool 50 can be manufactured from a single casting or alternatively from a multiple piece casting, with concave surfaces 76 and 78 and the interior circumferential surface of annular portion 52 being chrome plated if desired.

Figure 13:
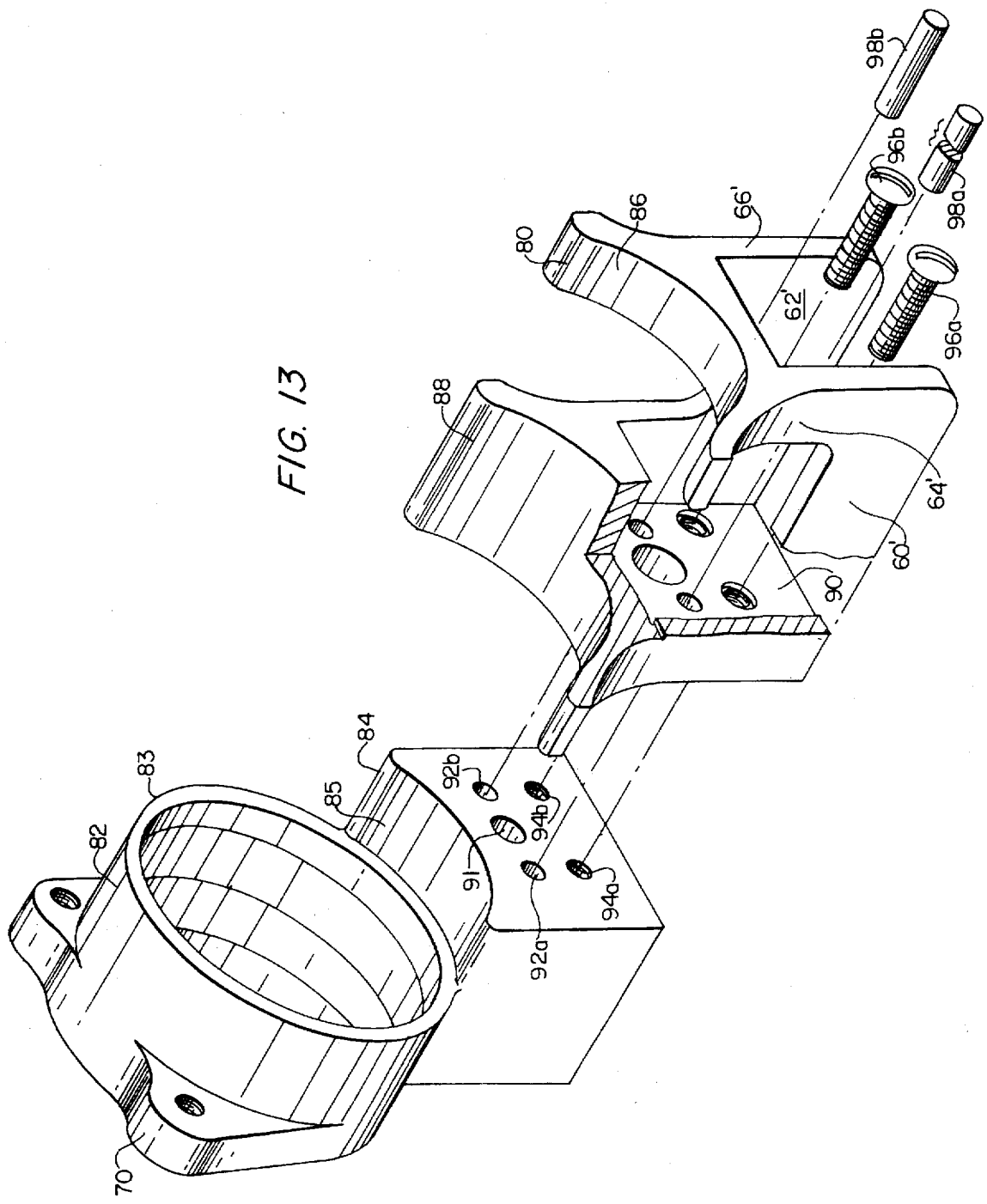
FIG. 13 is an exploded perspective view of a second embodiment of the apparatus in accordance with the present invention showing a separate can pocket and tooling retainer and a preferred method of assembly of the components.
Figure 14:
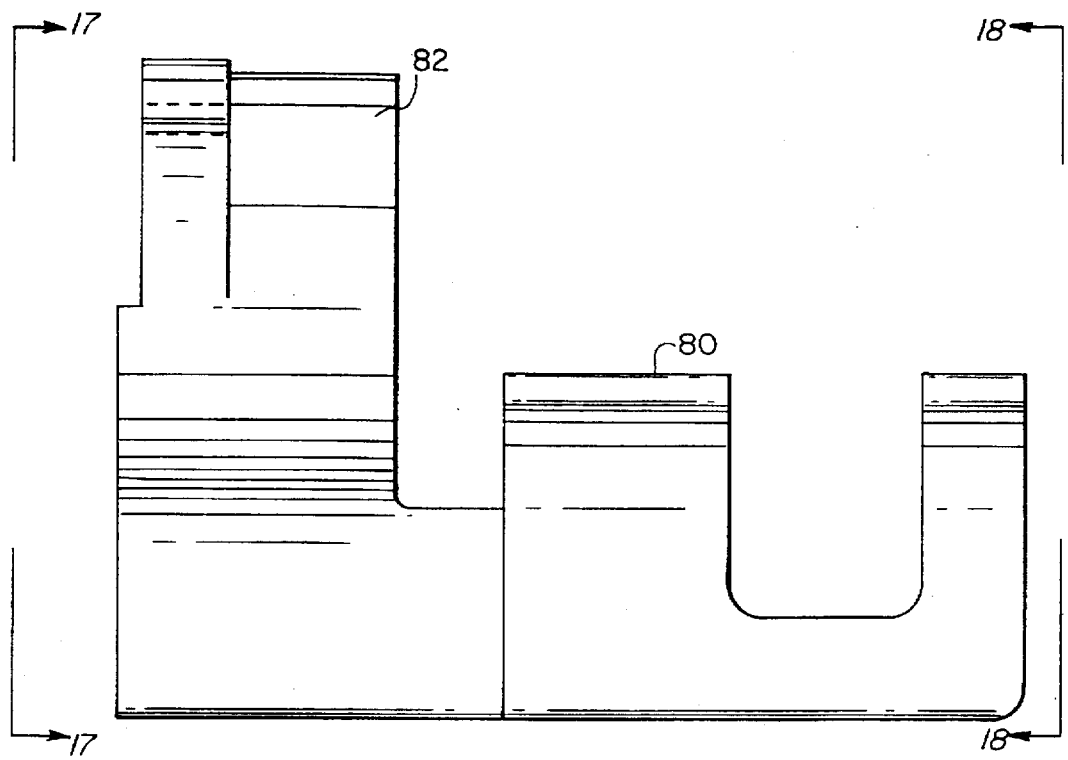
FIG. 14 comprises a side elevation view of the second embodiment of the two piece can support tool according to the present invention.
Figure 15:
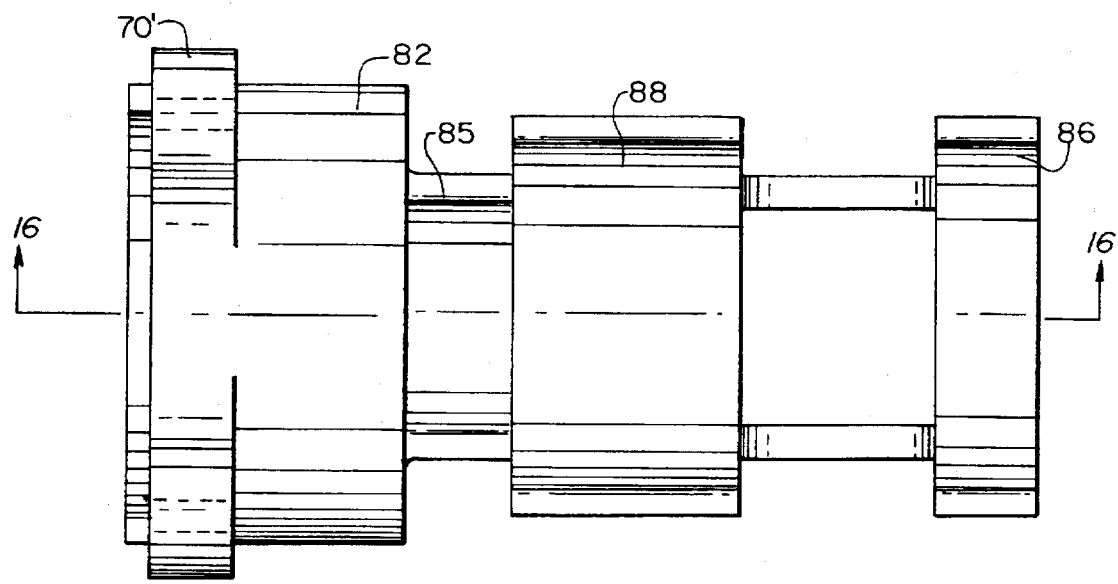
FIG. 15 comprises a top plan view of the can support tool shown in FIG. 14.
Figure 16:
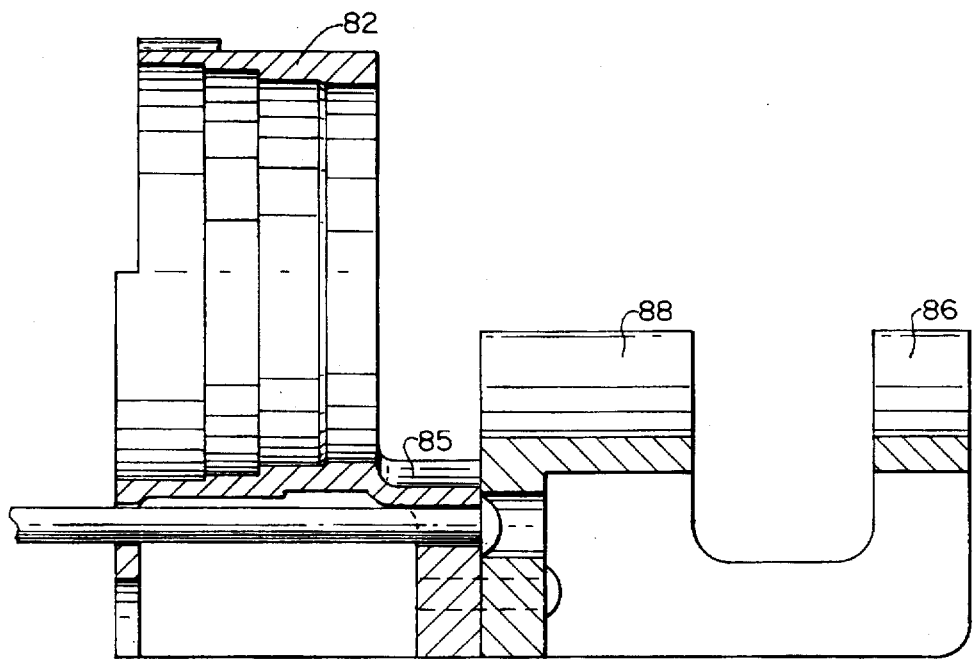
FIG. 16 is a bisecting sectional view taken along lines 16—16 of FIG. 15.
Figure 17:
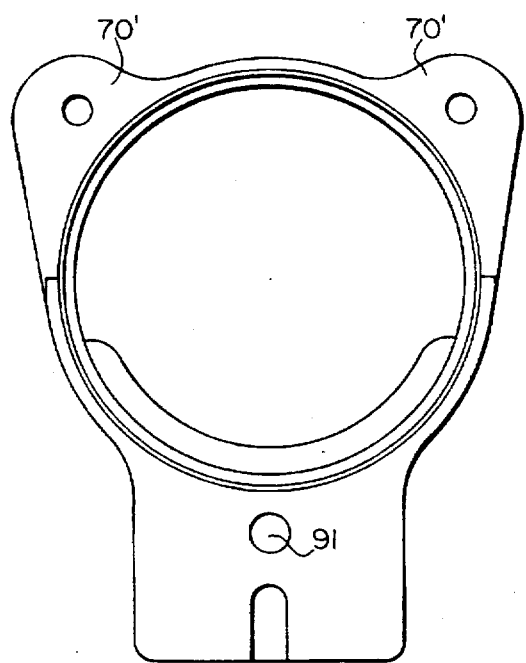
FIG. 17 is an end elevation view of the can support tool of FIG. 14 taken in the direction of arrows 17—17 of FIG. 14.
Figure 18:
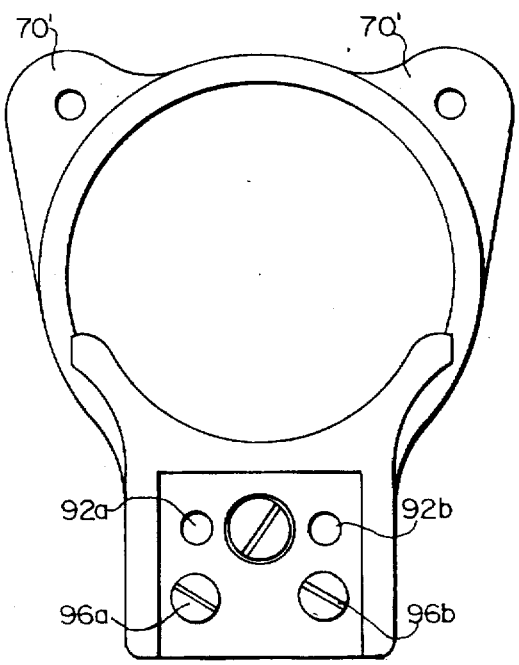
FIG. 18 is an end elevation view of the can support tool of FIG. 14 taken in the direction of arrows 18—18 of FIG. 14.

A second embodiment of the can support tool is shown in FIG. 13 and comprises a can pocket 80 and a tooling retainer 82, which when joined together form a can support tool substantially identical to the can support tool 50 described above. Tooling retainer 82 comprises an upper annular portion 83 configured to fit around the outer periphery of tooling die 68 and axially positioned relative to tooling die 68 and spindle housing 24a in the same fashion as for the unitary can support tool 50 as described above. Tooling retainer 82 further comprises a lower boxlike portion 84; a bolt hole 91 for passage of bolt 75 that secures tooling retainer 82 to a ram block portion of turret 20; bolt holes 94a and 94b for passage of bolts 96a and 96b respectively, that secure can pocket 80 to tooling retainer 82; and dowel pin holes 92a and 92b for close fit of dowel pins 98a and 98b respectively, that align and support can pocket 80 with tooling retainer 82.

Can pocket 80 comprises concave surfaces 86 and 88 for cradling a can 40, wherein concave surface 86 is defined on an upper periphery of an arcuate portion supported by two transverse parallel arms 64' and 66' connected to two axially extending parallel cantilever arms 60' and 62', and cantilever arms 60' and 62' are connected to a boss 90 that extends below concave surface 88. Boss 90 has throughholes corresponding to and in axial alignment with holes 91, 92a, 92b, 94a, and 94b in boxlike portion 84 of tooling retainer 82.

Figure 23:
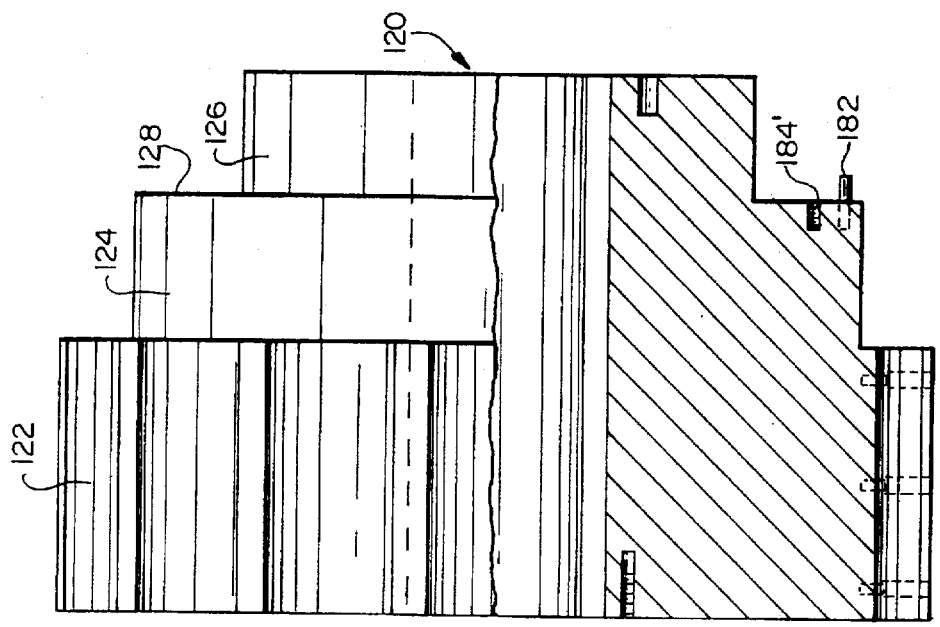
FIG. 23 is a partial sectional view taken along lines 23—23 in FIG. 22.
Figure 22:
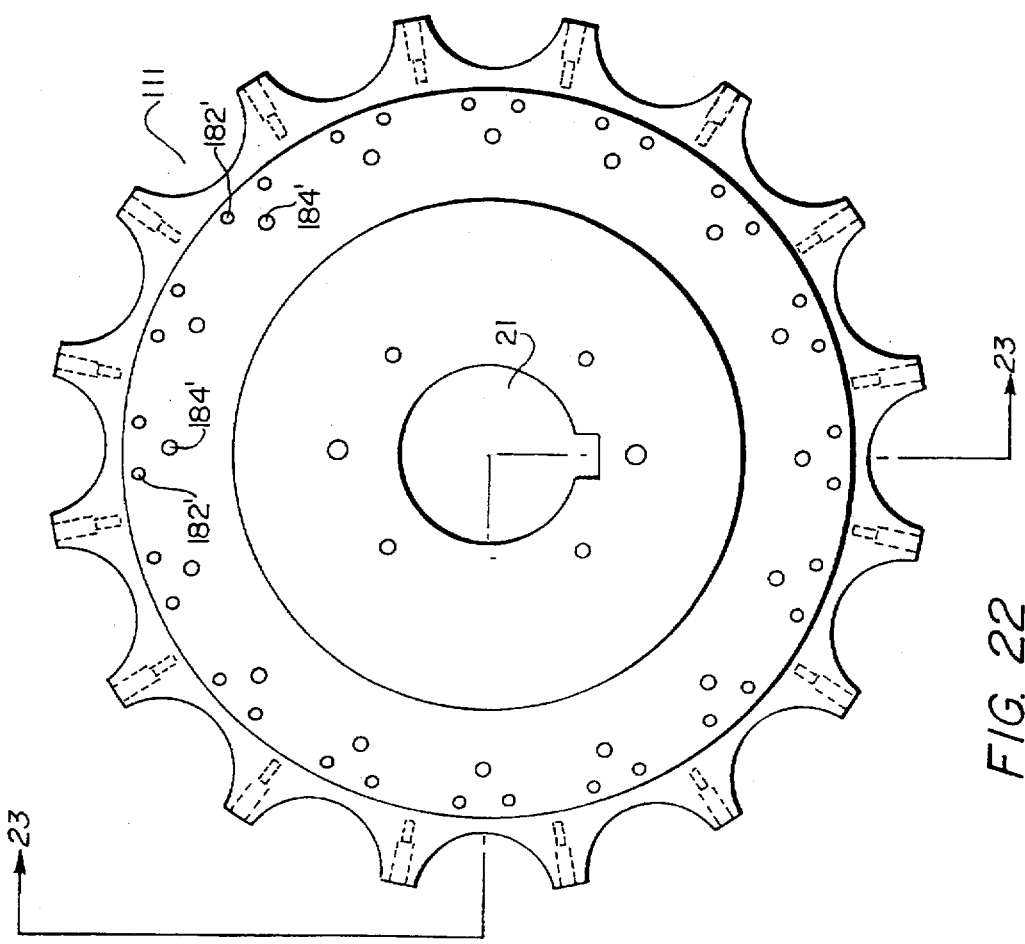
FIG. 22 is a transverse sectional elevation view of the ram block portion of the turret shown in FIG. 19, showing the scalloped outer periphery of the ram block for receiving spindle housings and the pin and bolt hole pattern for attachment of can pockets.

In a third, preferred embodiment of the apparatus for supporting a can during reshaping operations, a modified ram block portion 120 of turret 20 is provided in the shape of a stepped cylindrical block having a large diameter portion 122, an intermediate diameter portion 124, and a small diameter portion 126, as shown in FIG. 23. Large diameter portion 122 is scalloped around its outer periphery, as best shown in FIG. 22, with each scallop 111 forming a receptacle for a respective spindle housing 24a. The length of large diameter portion 122 in a direction parallel to the spindle axes is equal to the distance between two radially extending rims 74 and 77, as shown in FIG. 19, at each end of spindle housing 24a. Spindle housing 24a is fixedly attached to large diameter portion 122 with radially extending rims 74 and 77 straddling large diameter portion 122. Intermediate diameter portion 124 extends from large diameter portion 122 in a direction parallel to the spindle axes and for a distance approximately equal to the length of tooling retainer 82 in the second embodiment of the can support tool (shown in FIG. 13).

Tooling die 68 is held in position against rim portion 74 of spindle housing 24a by a locking ring 168 (shown in FIGS. 19 and 21). Locking ring 168 has internal threads at one axial end that engage with external threads on rim portion 74 of spindle housing 24a. The opposite axial end of locking ring 168 has an inwardly extending radial lip 169 that engages with radial end surface 68c of large diameter rim portion 68a on tooling die 68. As locking ring 168 is tightened onto rim portion 74 (in a leftward direction in FIG. 21), tooling die 68 is pulled up snugly against rim portion 74 of spindle housing 24a with radial end surface 68b abutting rim portion 74 (as shown in FIG. 21).

The radial shoulder 128 connecting intermediate diameter portion 124 with small diameter portion 126 provides a mounting surface for can pockets 180, which are each connected to radial shoulder 128 by two dowel pins 182 and a bolt 184 that fit into pin holes 182' and bolt hole 184', respectively, as shown in FIGS. 19, 22 and 23. Radial shoulder 128 is positioned such that when can pocket 180 is bolted and pinned to ram block portion 120 of turret 20, can pocket 180 will support can 40 coaxially with spindle ram assembly 26a and adjacent tooling die 68 at one end of spindle housing 24a prior to a necking operation. As the size of cans 40 is varied, can pocket 180 can be quickly and efficiently replaced with an appropriately sized can pocket by removing bolt 184 and pulling the can pocket free from locating pins 182. Can pockets 180 (as shown in FIG. 29) are substantially the same in construction as can pockets 80, described above for the second embodiment, and shown in FIG. 13.

As best seen in FIG. 29, can pocket 180 comprises concave surfaces 186 and 188 for cradling a can 40, wherein concave surface 186 is defined on an upper periphery of an arcuate portion supported by two transverse parallel arms 164 and 166 connected to two axially extending parallel cantilever arms 172 and 174, and cantilever arms 172 and 174 are connected to a boss 190 that extends below concave surface 188. Boss 190 has throughholes corresponding to and in axial alignment with holes 182' and 184' in ram block portion 120 on turret 20. Bolt 184 and pins 182 pass through these holes and connect each can pocket 180 to turret 20.

During a can reshaping operation, such as necking of the cans, the axial movement of spindle ram assemblies 26a and 26b is controlled by the contours of cam surfaces 36a, 38a, 36b and 38b, as discussed above. Cam followers 28a and 28b have rollers 30a and 32a; and 30b and 32b, respectively. Roller 32a and cam surface 38a drive spindle ram assembly 26a to the right in FIGS. 1 and 19; and roller 30b and cam surface 36b drive spindle ram assembly 26b to the left in FIGS. 1 and 19. The axial travel of spindle ram assembly 26a to the right in FIGS. 1 and 19 must be controlled closely since this travel determines the amount of movement of knockout punch 130, shown in FIG. 21, during the ejection of can 40 from tooling die 68. Therefore, roller 32a is rotatably supported on spindle ram assembly 26a at a fixed axial distance from the end of spindle ram assembly 26a supporting knockout punch 130. Similarly, the axial travel of spindle ram assembly 26b to the left in FIGS. 1 and 19 must be controlled closely since this travel determines the amount of movement of push pad 69 and the resultant movement of can 40 onto tooling die 68. Therefore, roller 30b is rotatably supported on spindle ram assembly 26b at a fixed axial distance from the end of spindle ram assembly 26b supporting push pad 69.

Roller 30a and cam surface 36a return spindle ram assembly 26a back to its starting position after ejection of can 40 from tooling die 68. Roller 32b and cam surface 38b return spindle ram assembly 26b back to its starting position after pushing can 40 the proper distance into tooling die 68. Because rollers 30a and 32b are merely returning spindle ram assemblies 26a and 26b to their starting positions, the axial travel of spindle ram assembly 26a to the left in FIGS. 1 and 19, and the axial travel of spindle ram assembly 26b to the right in FIGS. 1 and 19 need not be controlled with great accuracy. Therefore, rollers 30a and 32b can be pivotally mounted to spindle ram assemblies 26a and 26b, respectively, as will be explained in further detail below.

During high speed can reshaping operations the momentum of spindle ram assembly 26a can result in a tendency for one or both rollers 30a and 32a to break contact with cam surfaces 36a and/or 38a as the contour of cam 34a changes. If either roller breaks contact with cam 34a, the rotational speed of the roller will temporarily decrease. Therefore, upon making contact again with cam 34a, the roller will need to accelerate rapidly so that its rotational speed matches the relative speed between the orbiting spindle ram assembly 26a and stationary cam 34a. Similarly, the momentum of spindle ram assembly 26b can result in a tendency for one or both rollers 30b and 32b to break contact with cam surfaces 36b and/or 38b as the contour of cam 34b changes. Therefore, upon making contact again with cam 34b, the roller will need to accelerate rapidly so that its rotational speed matches the relative speed between the orbiting spindle ram assembly 26b and stationary cam 34b. During this period of acceleration, "skidding" between the roller and the cam is likely to occur—with resultant undesirable wear on the roller and the cam surfaces.

Figure 24:
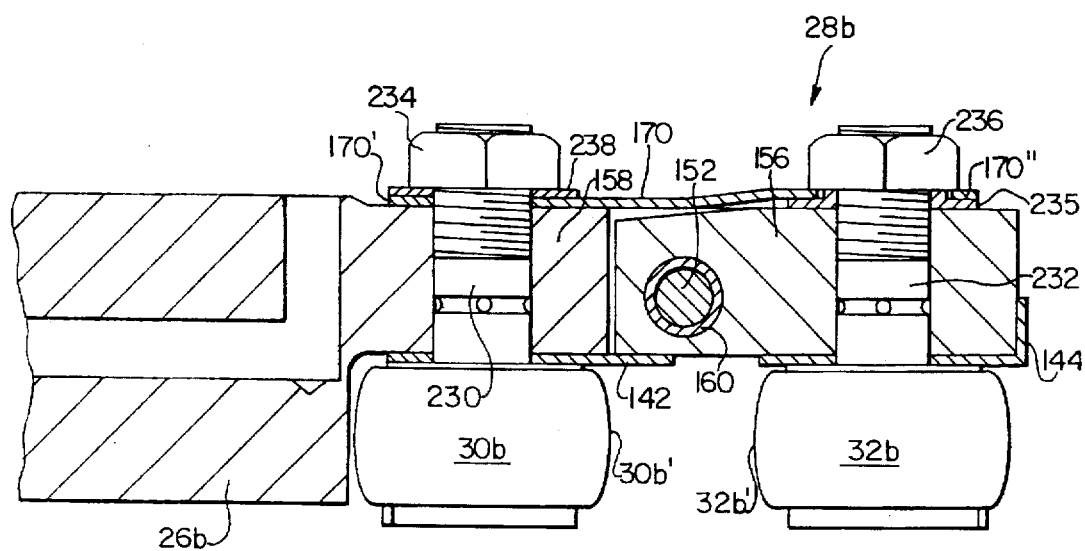
FIG. 24 is an enlarged sectional view of the preloaded cam follower assembly mounted on one end of a spindle ram assembly.

As best seen in FIGS. 20 and 24, this "skidding" and resultant wear of the cam is eliminated by pivotally mounting the outer roller (30a and/or 32b) on its respective spindle ram assembly (26a and/or 26b) and spring loading the roller into contact with the cam such that contact between the cam and the rollers is never broken.

Rollers 30a, 32a, 30b and 32b are provided with crowned outer peripheries 30a', 32a', 30b' and 32b', each having a radius that is approximately 20 inches, as shown in FIGS. 20 and 24. This ensures that the contact surface area between the rollers and the stationary cams is maintained as the outer rollers on each spindle ram assembly pivot about dowel pins 150 and 152, shown in FIGS. 20 and 24, respectively.

The following description of a preloaded cam follower assembly is given in reference to preloaded cam follower assembly 28b mounted on spindle ram assembly 26b, as shown in FIG. 24. However, the same description could apply to a preloaded cam follower assembly mounted at either axial end of turret 20. Furthermore, the preloaded cam follower assembly could be mounted on a spindle ram assembly being used to perform a variety of can reshaping operations.

Figure 25:
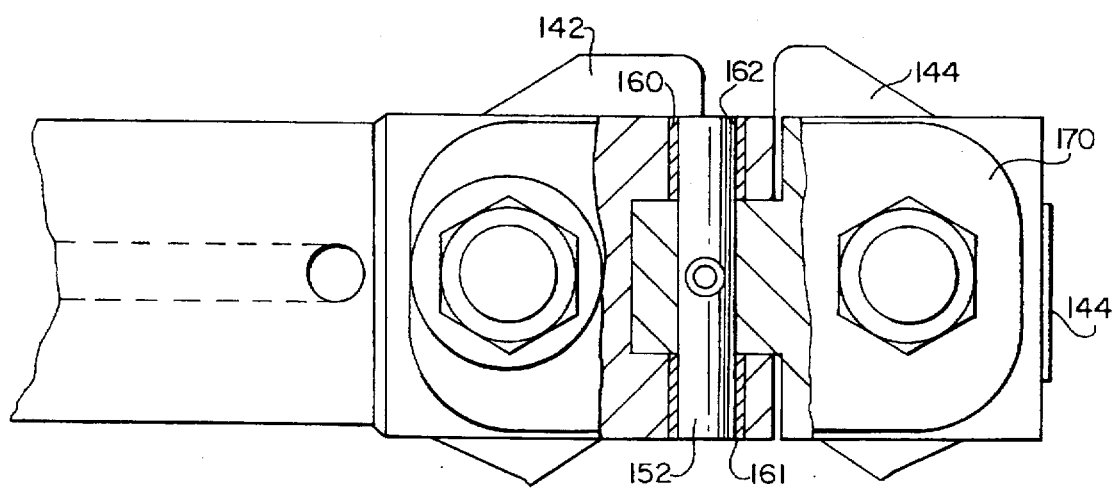
FIG. 25 is a top plan view partially in cross section of the preloaded cam follower assembly shown in FIG. 24.
Figure 26:
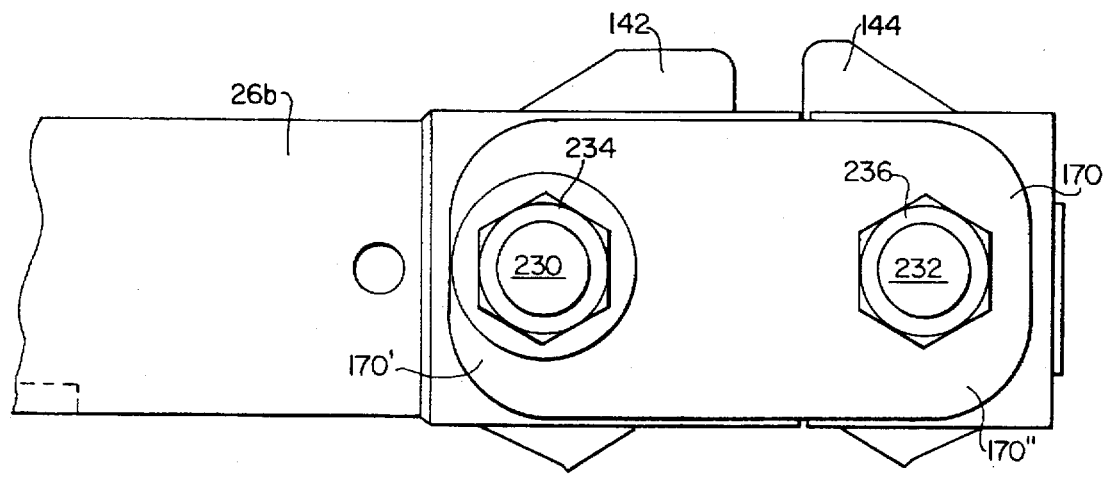
FIG. 26 is a top plan view of the preloaded cam follower assembly.

The outer end of spindle ram assembly 26b has a tongue and groove, or tenon and mortise construction, wherein outer roller 32b is rotatably mounted by roller shaft 232 on the tenon or pivot 156, which is in turn pivotally mounted by dowel pin 152 to the outer grooved portion or mortise 158 of spindle ram assembly 26b. Dowel pin 152 extends through the grooved portion 158 and pivot 156 at right angles to the axes of rotation of rollers 30b and 32b. A bushing 160, preferably made from brass, can be press fit into aligned holes 161 and 162 through grooved portion 158 in order to provide a relatively frictionless support for dowel pin 152, as shown in FIG. 25. A substantially flat, rectangular spring 170 is mounted between grooved portion 158 and pivot 156 of spindle ram assembly 26b. Spring 170 is mounted over the ends of roller shafts 230 and 232 and held in place by roller mounting nuts 234 and 236.

The inner end 170' of spring 170 is held fixedly in position relative to grooved portion 158 of spindle ram assembly 26b by spacer 238 and roller mounting nut 234. The outer end 170" of spring 170 is prestressed and deflected out of the plane of inner end 170' and is held in place around roller shaft 232 by stepped spacer 235 and roller mounting nut 236, as shown in FIG. 24. Spring 170 provides a torsional force tending to rotate pivot 156 about pin 152 and relative to grooved portion 158 in a clockwise direction as viewed in FIG. 24. The step provided on stepped spacer 235 provides clearance between roller mounting nut 236 and outer end 170" of spring 170. This clearance allows for relative movement between spring 170 and roller shaft 232 as roller 32b is maintained in constant contact with cam surface 38b of cam 34b by the torsional force generated by spring 170.

Figure 27:
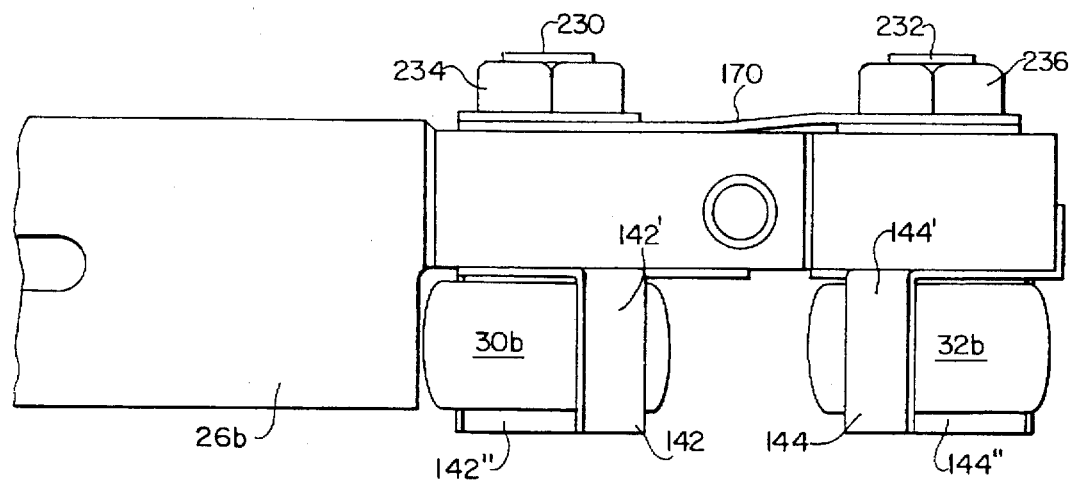
FIG. 27 is a front elevation view of the preloaded cam follower assembly showing the cam wipers.
Figure 28:
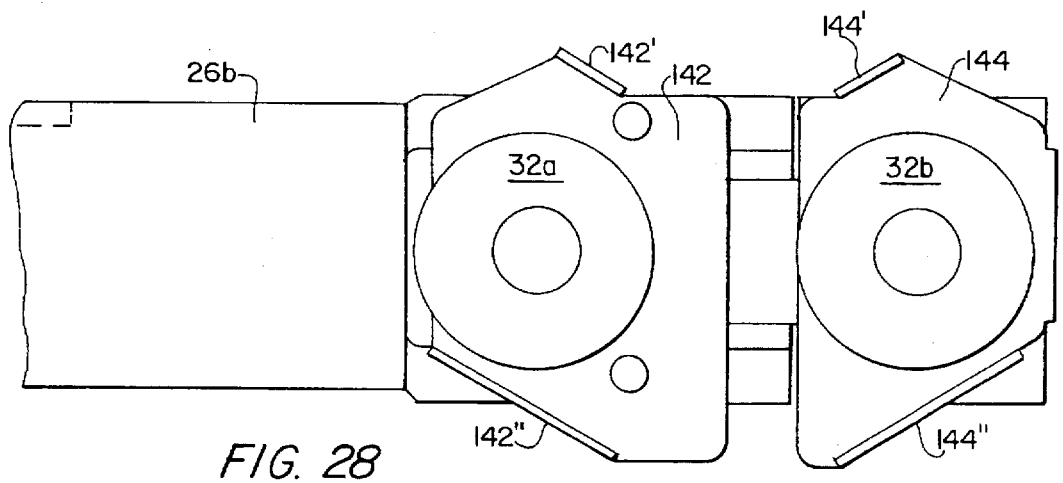
FIG. 28 is a side elevation view of the preloaded cam follower assembly showing the cam wipers.

Cam wipers 142 and 144 are mounted on roller shafts 230 and 232, respectively, as shown in FIGS. 24–28. The purpose of the cam wipers is to direct lubrication fluids between cam rollers and their respective cam surfaces. Cam wiper lips 142' and 142" extend from cam wiper 142 parallel to the axis of roller shaft 230 and for a distance slightly greater than the width of roller 30b, as seen in FIG. 27. Similarly, cam wiper lips 144' and 144" extend from cam wiper 144 parallel to the axis of roller shaft 232 and for a distance slightly greater than the width of roller 32b.

Modifications and variations of the above-described embodiments of the present invention are possible, as appreciated by those skilled in the art in light of the above teachings. For example, the means for attaching can support tool 50 to spindle housing 24 and turret 20, or can pocket 180 to ram block 120, can be varied by changing the number of bolts and/or pins used for attachment to the turret.

It is therefore to be understood that, within the scope of the appended claims and their equivalents, the invention may be practiced otherwise than as specifically described.

LIST OF DESIGNATORS 20 turret
21 turret shaft
22 spindle assembly
24a spindle housing
24b spindle housing
26a spindle
26b spindle
28a cam follower
28b cam follower
30a roller
30a' crowned surface
30b roller
30b' crowned surface
32a roller
32a' crowned surface
32b roller
32b' crowned surface
34a cam member
34b cam member
36a cam face
36b cam face
38a cam face
38b cam face
40 can
50 can support tool
52 annular portion
54 boxlike portion
56 arcuate portion
58 arcuate portion
60 axially extending arm
60' cantilever arm
62 axially extending arm
62' cantilever arm
64 transverse arm
64' transverse arm
66 transverse arm
66' transverse arm
68 tooling die
68a large diameter rim portion 68b radial end surface
68c radial end surface
69 push pad
70 lugs
70' internal radial shoulder
71 o-ring
72 segmental flange
72' segmental flange
73 bolt
74 rim
74' radial end surface
74" radial end surface
75 bolt
76 concave surface
77 rim
78 concave surface
80 can pocket
82 tooling retainer
83 annular portion
84 boxlike portion
85 concave surface
86 concave surface
88 concave surface
90 boss
91 bolt hole
92a dowel pin hole
92b dowel pin hole
94a bolt hole
94b bolt hole
96a bolt
96b bolt
98a dowel pin
98b dowel pin
111 scallop
120 ram block
122 large diameter portion of ram block
124 intermediate diameter portion of ram block
126 small diameter portion of ram block
128 radial shoulder
130 knockout punch
131 internal recess
132 base of knockout punch
133 nut
135 threaded stud
142 cam wiper
142' cam wiper lip
142" cam wiper lip
144 cam wiper
144' cam wiper lip
144" cam wiper lip
150 pivot pin
152 pivot pin
156 pivot
158 grooved portion
160 bushing
161 hole through grooved portion
162 hole through grooved portion
164 transverse arm
166 transverse arm
168 locking ring
169 radial lip
170 spring
170' inner end of spring
170" outer end of spring
172 cantilever arm
174 cantilever arm
182 pin
182' pin hole
184 bolt
184' bolt hole
190 boss
230 roller shaft
232 roller shaft
234 roller mounting nut
235 stepped spacer
236 roller mounting nut
238 spacer

What is claimed is:

1. An apparatus for performing reshaping operations on a container, said apparatus including:

a turret drive shaft;

a turret mounted on said turret drive shaft for rotation with said turret drive shaft;

a plurality of spindle housings mounted on said turret for orbital rotation about said turret drive shaft;

a plurality of spindle ram assemblies mounted for axial reciprocation within said spindle housings, each of said spindle ram assemblies including a non-pivotal portion and a pivotal portion pivotally connected to said non-pivotal portion;

a disk shaped cam fixedly mounted substantially perpendicular to said turret drive shaft and having axially opposite cam guide surfaces;

each of said spindle ram assemblies having two cam followers mounted thereon with one of said cam followers being mounted on said pivotal position and an elongated spring plate means extending between said pivotal portion and said non-pivotal portion for urging said cam follower on said pivotal portion into contact with one of said axially opposite cam guide surfaces while the other cam follower contacts the other of said axially opposite cam guide surfaces.

2. A preloaded cam follower ram assembly including:

a fixed non-pivotal portion and a pivotal portion wherein :said pivotal portion is pivotally connected to said fixed portion by a mortise and tenon joint, said fixed portion having said mortise at one axial end and said pivotal portion having said tenon at an adjoining axial end;

a dowel pin having a pin pivot axis passing through said mortise and said tenon so that said pivotal portion is mounted for pivotal movement relative to said first portion about said pin pivot axis;

a first cam follower roller having a first roller axis oriented perpendicularly to said pin pivot axis and being mounted on said second portion for rotation about said first roller axis and a second cam follower roller having a second roller axis oriented perpendicularly to said pin pivot axis and mounted on said second portion for rotation about said second roller axis;

an elongated spring plate connected in cantilever manner to said fixed portion on one end and having an opposite end engaging said pivotal portion so as to exert a torsional force on said pivotal portion tending to rotate said second cam follower roller about said pivot pin axis so as to urge said second cam follower roller toward said first cam follower roller.

3. A preloaded cam follower assembly comprising:

a ram member terminating in an axial end;

a pivot member;

a pivot connection between said cam member and said pivot member;

said pivot connection defining a pivot axis about which said pivot member pivots;

a first cam follower roller having a central axis and being rotatably mounted to said ram member near said axial end;

a second cam follower having a central axis and being rotatably mounted on said pivot member;

biasing means comprising a substantially flat metal spring connected between said ram member and said pivot member for applying a torsional force to said pivot member tending to rotate said pivot member about said pivot axis, thereby tending to rotate said second cam follower central axis relative to said first cam follower central axis.

4. The preloaded cam follower assembly of claim 3 wherein said second cam follower comprises a roller having a crowned surface.

5. An apparatus for performing reshaping operations on a container, said apparatus comprising:

a turret drive shaft;

a turret mounted on said turret drive shaft for rotation with said turret drive shaft;

a plurality of ram housings mounted on said turret for orbital rotation about said turret drive shaft;

a plurality of ram assemblies each of which is mounted for axial reciprocation within one of said ram housings;

said ram assemblies comprising a first ram assembly and a second ram assembly each having first and second opposite axial ends;

the first axial end of a said second ram assembly comprising a pivotal tenon portion;

said first ram assembly having a mortise portion at one end;

said pivotal tenon portion being pivotally mounted to said mortise portion of said first ram assembly;

a stationary, substantially disk-shaped cam member being mounted substantially perpendicular to said turret drive shaft, said cam member having first and second contoured, axially opposite cam guide surfaces;

a first cam follower roller being mounted on said pivotal tenon portion, and a second cam follower roller being mounted on said mortise portion, said first and second cam follower rollers each having a crowned outer surface; and biasing means for biasing said first cam follower into contact with said first cam guide surface and for biasing said second cam follower into contact with said second cam guide surface, said biasing means being connected between said pivotal portion and said mounting portion and comprising a substantially flat, rectangular spring.

6. The apparatus of claim 5 additionally including a pivot pin passing through said tenon portion and said mortise portion to pivotally support said pivotal tenon portion on said mortise portion.

7. The apparatus of claim 6 additionally including first and second roller shafts, respectively supporting said first and second cam follower rollers on said tenon portion and said mortise portion.

8. The apparatus of claim 7 further including:

plate members connected to said pivotal tenon portion and said mortise portion and extending partially around the outer periphery of said cam followers rollers for directing lubricants in between said cam followers rollers and said cam guide surfaces.

9. A preloaded cam follower ram assembly mounted for orbital rotation about an axis of rotation including:

a fixed non-pivotal portion and a pivotal portion wherein said pivotal portion is pivotally connected to said fixed portion by pivot means for pivotally supporting said pivotal portion relative to said fixed non-pivotal portion movement about a pivot axis substantially perpendicular to said axis of rotation;

a first cam follower roller mounted on said second portion for rotation and a second cam follower roller mounted on said second portion for rotation;

an elongated spring plate oriented approximately parallel to said axis of rotation providing a torsional force on said pivotal portion tending to rotate said second cam follower roller about said pivot pin axis so as to urge said second cam follower roller toward said first cam follower roller.

* * * * *